Patented Mar. 2, 1937

2,072,348

UNITED STATES PATENT OFFICE 2,072,348

CHLORINATED TRIALKYL AMINES AND METHOD OF PRODUCING

Kyle Ward, Jr., Wilmington, Del., assignor to Hercules Powder Company, Wilmington, Del., a corporation of Delaware No Drawing. Application March 5, 1934, Serial No. 714,095

18 Claims. (Cl. 260—127)

This invention relates to chlorinated trialkyl amines and to methods for their production.

Chlorinated trialkyl amines in which each alkyl group contains as a substituent only one chlorine atom have hitherto been unknown, but may readily be produced in accordance with this invention.

The tri-(chloralkyl)-amines produced by the method in accordance with this invention are heavy oils the physical properties of which, of course, depend on the particular alkyl groups present. In some cases, crystals form from these oils on standing. These amines form well defined crystalline addition products with strong acids, which have definite melting points. Because of the presence of the chlorine atom, these amines are very reactive and form valuable intermediates for a large number of reactions of both theoretical and practical value. Certain of the amines in accordance with this invention especially those with chlorine in β-position have also a pronounced vesicant action on the skin, a property which renders them valuable for use in medicine or in chemical warfare.

The method in accordance with this invention involves the treatment of a tri-(hydroxylalkyl)-amine, as for example, tri-(hydroxyethyl)-amine (triethanolamine), tri-(hydroxypropyl)-amine, tri-(hydroxybutyl)-amine, etc., with a chlorinating agent as, for example, thionyl chloride, phosphorus trichloride, phosphorus pentachloride, hydrochloric acid, or the like, under conditions adapted for the replacement of each hydroxyl group present by a chlorine atom. This reaction may be represented by the non-stoichiometric equation:

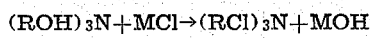

$$(ROH)_3N + MCl \rightarrow (RCl)_3N + MOH$$

where R is any alkyl group minus one hydrogen atom, and MCl is a chlorinating agent.

More specifically the method in accordance with this invention involves the gradual admixture of the tri-(hydroxyalkyl)-amine and the chlorinating agent in the desired quantities. Preferably a considerable excess of chlorinating agent will be used, thus, for example, an excess of about 30% is desirable. However the use of such excess is not necessary, for the reaction occurs with the ingredients present in any ratio. Because of the violence of the reaction, it is desirable to carry out the reaction in solution in an inert solvent, as, for example, chloroform, benzene, toluene, although the use of a solvent is not necessary. Where reaction takes place in a solvent it is usually desirable to reflux the solution after the addition of the reactants is completed for a short period, say, two to three hours, to insure complete reaction and a high yield. Such procedure is, however, not essential. When the reaction is completed, the solvent, if any, and the by-products of the reaction and excess chlorinating agent, if any, are removed, for example, by vacuum distillation or extraction, and the product (in the form of its salt) purified by, for example, recrystallization.

If desired, a salt, for example, the hydrochloride, of the tri-(hydroxyalkyl)-amine may be used in place of the amine for the reaction.

The following examples are given as illustrative of the specific embodiment of my invention.

Example I

To 270 cc. of thionyl chloride dissolved in chloroform were added drop by drop with mechanical stirring 123 cc. triethanolamine in chloroform. After the addition was complete, the mixture was refluxed a few hours to insure complete reaction. The chloroform, thionyl chloride and by-products were removed by vacuum distillation and the product recrystallized several times from acetone. The product consists of colorless prisms, melting at 131° C. It contains 5.7% N (theoretical 5.8%) and 58.7% Cl (theoretical 58.8%). This material, tri-(β-chlorethyl)-amine hydrochloride, reacts with alkali derivatives of cellulose to give nitrogenous cellulose derivatives. In chloroform solution or in the solid form (probably absorbed in an aqueous solution) it produces blisters on the skin within four to twelve hours. The free amine may be produced by treating the hydrochloride with dilute sodium bicarbonate, carbonate or hydroxide, when it separates as a heavy brownish oil.

Example II 46 g. triethanolamine hydrochloride in 75 cc. benzene+72 cc. thionyl chloride react smoothly and gradually at room temperature until all the crystals have disappeared and two liquid layers remain. On vacuum distillation a mass of crystals remain from which 42 g. pure tri-(β-chlorethyl)-amine hydrochloride were produced by recrystallization from acetone. The free amine may be produced as described above.

Example III 37 g. triethanolamine hydrochloride were added to 62.5 g. phosphorus pentachloride in 100 cc. chloroform. This was refluxed on the steam bath until there was no further reaction. The volatile products were distilled off. The mixture was then dissolved in water and neutralized with calcium hydroxide. The calcium phosphate so formed was filtered off and washed with chloroform. The aqueous filtrate was also extracted with chloroform. The combined chloroform extracts were now evaporated with aqueous hydrochloric acid and the crystalline residue recrystallized from acetone. This yielded 32 g. tri-($\beta$-chlorethyl)-amine hydrochloride. The free amine may be produced as described above.

It is understood that in place of the chlorinating agents described, the corresponding bromine and iodine reagents may be employed in accordance with this invention, with the resultant formation of bromo- and iodo-alkyl amines.

What I claim and desire to protect by Letters Patent is:

1. A tri-($\omega$-chloralkyl)-amine.
2. Tri-($\beta$-chlorethyl)-amine.
3. The method of producing a tri-($\omega$-chloralkyl)-amine which includes reacting a tri-($\omega$-hydroxyalkyl)-amine with a chlorinating agent.
4. The method of producing a tri-($\omega$-chloralkyl)-amine which includes reacting a tri-($\omega$-hydroxyalkyl)-amine with thionyl chloride.
5. The method of producing a tri-($\omega$-chloralkyl)-amine which includes reacting a tri-($\omega$-hydroxyalkyl)-amine with phosphorus pentachloride.
6. The method of producing a tri-($\omega$-chloralkyl)-amine which includes reacting on a tri-($\omega$-hydroxyalkyl)-amine with an excess of a chlorinating agent, removing excess chlorinating agent and by-products of the reaction after completion of the reaction, and recovering a substantially pure tri-($\omega$-chloralkyl)-amine.
7. The method of producing a tri-($\beta$-chlorethyl)-amine which includes reacting tri-($\beta$-hydroxyethyl)-amine with a chlorinating agent.
8. The method of producing a tri-($\beta$-chlorethyl)-amine which includes reacting tri-($\beta$-hydroxyethyl)-amine with thionyl chloride.
9. The method of producing a tri-($\beta$-chlorethyl)-amine which includes reacting tri-($\beta$-hydroxyethyl)-amine with phosphorus pentachloride.
10. The method of producing a tri-($\beta$-chlorethyl)-amine which includes reacting on tri-($\beta$-hydroxyethyl)-amine with an excess of a chlorinating agent, removing excess chlorinating agent and by-products of the reaction after completion of the reaction, and recovering substantially pure tri-($\beta$-chlorethyl)-amine.
11. A tri-($\omega$-halogenoalkyl)-amine.
12. The method of producing a tri-($\omega$-halogenoalkyl)-amine which includes reacting a tri-($\omega$-hydroxyalkyl)-amine with a halogenating agent.
13. A hydrohalide salt of a tri-($\omega$-halogenoalkyl)-amine.
14. A hydrochloride salt of a tri-($\omega$-chloralkyl)-amine.
15. The method of producing a hydrohalide salt of a tri-($\omega$-halogenoalkyl)-amine which includes reacting a hydrohalide salt of a tri-($\omega$-hydroxyalkyl)-amine with a halogenating agent.
16. The method of producing a hydrochloride salt of a tri-($\omega$-chloralkyl)-amine which includes reacting a hydrochloride salt of a tri-($\omega$-hydroxyalkyl)-amine with a chlorinating agent.
17. The method of producing a hydrohalide salt of a tri-($\omega$-halogenoalkyl)-amine which includes reacting a tri-($\omega$-hydroxyalkyl)-amine with a halogenating agent.
18. The method of producing a hydrochloride salt of a tri-($\omega$-chloralkyl)-amine which includes reacting a tri-($\omega$-hydroxyalkyl)-amine with a chlorinating agent.

KYLE WARD, Jr.